United States Patent [19]

Petersen

[11] Patent Number: 4,525,766
[45] Date of Patent: Jun. 25, 1985

[54] METHOD AND APPARATUS FOR FORMING HERMETICALLY SEALED ELECTRICAL FEEDTHROUGH CONDUCTORS

[75] Inventor: Kurt E. Petersen, San Jose, Calif.

[73] Assignee: Transensory Devices, Inc., Fremont, Calif.

[21] Appl. No.: 573,508

[22] Filed: Jan. 25, 1984

[51] Int. Cl.³ .................. H01G 7/00; H05K 5/02; H04N 9/09
[52] U.S. Cl. .................. 361/283; 29/25.42; 174/52 FP; 357/51
[58] Field of Search .................. 361/283; 427/79; 29/25.41, 25.42; 357/51; 174/52 FP

[56] References Cited

U.S. PATENT DOCUMENTS

| | | | |
|---|---|---|---|
| 3,138,744 | 6/1964 | Kilby | 357/51 |
| 3,174,112 | 3/1965 | Stelmak | 357/51 X |
| 3,386,008 | 5/1968 | Layer et al. | 357/51 X |
| 3,397,278 | 8/1968 | Pomerantz | 174/52 |
| 3,397,447 | 8/1968 | Currin et al. | 357/51 X |
| 4,193,836 | 3/1980 | Youmans et al. | 357/51 X |
| 4,475,007 | 10/1984 | Ohno | 174/52 FP |

OTHER PUBLICATIONS

Sander, C. S., Knutti, J. W. & Meindl, J. D., "A Monolithic Capacitive Pressure Sensor with Pulse-Period Output", *IEEE Transactions on Electron Devices*, vol. ED-27, No. 5, May 1980.
Wallis, G. & Pomerantz, D., "Field Assisted Glass-Metal Sealing", *Journal of Applied Physics*, vol. 40, No. 10, Sep. 1969.
Lee, Y. S. & Wise, K. D., "A Batch-Fabricated Silicon Capacitive Pressure Transducer with Low Temperature Sensitivity", *IEEE Transactions on Electron Devices*, vol. ED-29, No. 1, Jan. 1982.
Ko, W. H., Bao, M. H. & Hong, Y. D., "A High-Sensitivity Integrated-Circuit Capacitive Pressure Transducer", *IEEE Transactions on Electron Devices*, vol. ED-29, No. 1, Jan. 1982.

*Primary Examiner*—Donald A. Griffin
*Attorney, Agent, or Firm*—Fitch, Even, Tabin & Flannery

[57] ABSTRACT

Hermetically sealed electrical feedthrough conductors are formed across the periphery or boundary between a hermetically sealed region on a semiconductor substrate and a second or external region thereof by first forming a planar insulative layer on the surface of the silicon substrate along the predetermined path of the feedthrough conductor across the periphery, said insulative layer having at least one planar projection on each side thereof extending out from the path and coming to a point, and then forming thereon a planar metal feedthrough conductor layer that substantially covers the insulative layer, including corresponding metal planar projections. An insulator element sized to encapsulate the region to be sealed is then mallory bonded to the periphery, including the feedthrough conductor, so as to form a hermetic seal along the entire periphery including in the region of said feedthrough conductor. The planar projections form a compression bond that eliminates any tenting region that would otherwise form beneath the insulator element at the edges of the feedthrough conductor and the underlying insulative layer.

21 Claims, 9 Drawing Figures

METHOD AND APPARATUS FOR FORMING HERMETICALLY SEALED ELECTRICAL FEEDTHROUGH CONDUCTORS

The present invention is generally directed to hermetically sealed semiconductor devices and more particularly relates to methods and devices for providing hermetically sealed electrical feedthrough conductors across the periphery or boundary between a hermetically sealed region formed on a semiconductor substrate and a second or external region thereof.

One of the primary types of semiconductor devices which use hermetically sealed regions are solid-state sensors. Typically, a sensor must be exposed to its environment to function. This is in contrast to conventional integrated circuits which are normally packaged to be protected from the outside environment. However, sensors must also be protected from the environment. For example, a capacitive pressure sensor formed on a silicon substrate may include a thin diaphragm formed in the silicon which is designed to deform under the influence of variations in pressure. One side of the diaphragm is exposed to the environment and the other side forms a part of a sealed chamber whose walls comprise the parallel plates of the variable capacitor of the sensor. See, e.g., Sander, et al., "A Monolitic Capacitive Pressure Sensor With Pulse-Period Output", *IEEE Transactions on Electron Devices,* Vol. Ed.-27, No. 5, May 1980. Such a chamber must be heremetically sealed to provide a reference pressure and to prevent variations in capacitance caused by variations in the dielectric constant of the gaseous gap between the plates of the capacitor.

The protection problem is further complicated where integrated circuits are added in close proximity to the sensor. The advantage of on-board integrated circuitry is that it can eliminate the effect of output lead stray capacitance, which may be as large as the capacitance of the transducer's capacitor. Unstable lead capacitances provide a noise source that can obscure the actual pressure signal. A major problem with integrated circuits formed on a silicon substrate, however, is that such circuits are sensitive, for example, to temperature, moisture, magnetic fields, electrostatic fields, electomagnetic interference and visible light.

To provide protection for a sensor and any associated integrated circuit, various methods are known in the art for encapsulating these elements in a hermetically sealed region. The most widely used and accepted method is to use field assisted glass-to-silicon bonding. This technique is known variously as "anodic bonding," "electrostatic bonding" and "mallory bonding." See, e.g., U. S. Pat. No. 3,397,278, Wallis and Pomerantz, "Field Assisted Glass-Metal Sealing", *Jour. of App. Phys.,* Vol. 40, No. 10, September, 1969, and Barth, "Silicon Sensors Meet Integrated Circuits," *IEEE Spectrum,* September, 1981. This type of bonding involves a mating of an optically flat insulator substrate, typically glass, to a corresponding flat surface on a silicon substrate. It has been found that the best anodic bonding occurs with Corning No. 7740 Pyrex glass, a glass substrate that has thermal expansion characteristics that closely match that of silicon. It is important to have matching thermal expansion characteristics to avoid freezing into the bond high stresses that may contribute to early failure of the bond seal.

The advantage of this bonding technique is that no glue is used in the bonding process nor does the bonded area include melted material, as when a higher temperature fusion bond is attempted. These prior art techniques require that any on-board circuits be well separated from the sealing area. The absence of such liquids with mallory bonding enables the bonding area to be precisely defined by the mating areas of the glass and silicon. The use of glass also provides another advantage. It enables the quality of the bond to be optically inspected. Pressure sensor diaphragms can also be etched and optically inspected after bonding.

To create a typical electrostatic bond, the planar surfaces of the glass and silicon substrates are placed contiguous to one another and heated to between 300° and 600° C. At this temperature, the glass insulator becomes conductive. Then a large DC voltage, in the range of 400–2,000 volts, is applied between the two substrates, with a negative polarity on the glass substrate. When both substrates are conductive, the high applied voltage becomes concentrated across the gap between them. This high electric field results in very large electrostatic forces pulling the two substrates together into intimate contact. The high temperature combined with large electrostatic forces hermetically seals the silicon substrate to the glass substrate on an atomic scale. Note that similar hermetic seals can be obtained between glass and any metal, provided the metal forms a strong adherent oxide during the bonding process.

A problem with the above described electrostatic bonding method is that it is highly sensitive to topographical variations in the surface of either the silicon or the glass substrate. To generate a hermetic seal, no steps or other surface irregularities in either the silicon substrate or glass substrate surface (caused by a scratch in the surface, insufficient surface polishing, or the like) can be greater than about 500 angstroms-1,000 angstroms in height. Steps greater than about 500 angstroms (0.05 micrometers) may cause the glass to "tent" over the step, leaving an air passage at the base of the step.

A significant problem in the use of anodic bonding in state of the art sensor devices has been the difficulty encountered in the design of electrical feedthrough conductors from inside a hermetically sealed cavity across the sealed boundary or periphery to the outside environment. Prior art feedthrough conductors formed on the surface of the silicon substrate have been defective in that they created uncontrolled "steps" in the surface of the silicon or glass substrate in the bonding area, thereby creating tenting and subsequent air leakage into the sealed area. Also attempted have been the formation of diffused feedthrough conductors across the sealed boundary, in which p-type lines diffused in an n-type silicon substrate carry electrical signals. The glass substrate is then sealed directly over these lines. A significant problem with this latter technique is that electrical leakage between the n and p layers is induced during the bonding process, which tends to degrade the p-n junction. Such a diffused feedthrough also has a fairly high resistance, which limits the amount of current it can supply to any integrated circuit formed inside the hermetically sealed region. See, e.g., Y. S. Lee and K. D. Wise, "A Batch-Fabricated Silicon Capacitive Pressure Transducer With Low Temperature Sensitivity," *IEEE Transactions on Electron Devices,* Vol. Ed-29, page 42, 1982, and W. H. Ko, et al., "A High Sensitivity Integrated Circuit Capacitive Pressure Transducer," *IEEE Transactions on Electron Devices,* Volt. Ed-29, page 48, 1982. None of these attempts has been successful in obtaining a low resistance, low leakage, high quality feedthrough conductor across a hermetically sealed boundary.

Accordingly, it is an object of the present invention to provide hermetically sealed electrical feedthrough conductors that are low resistance, low leakage, and of high quality, and which can be formed during batch fabrication on a planar semiconductor substrate across the periphery between a hermetically sealed chamber or region and a second chamber or the external environment.

Another object of the present invention is to provide a hermetically sealed electrical feedthrough conductor which uses sharp planar projections, sharp edges and deformable thin film topographical structures to form a hermetic seal during electrostatic bonding of a silicon substrate to a glass substrate.

A further object of the present invention is to provide means for protecting any integrated circuit formed in a region to be encapsulated in a hermetically sealed chamber from any adverse affects resulting from the anodic bonding process.

Yet another object of the present invention is to provide hermetically sealed electrical feedthrough conductors having a plurality of sharp planar projections to enhance the reliability of the hermetic bond resulting therefrom.

These and other objects of the present invention will become apparent in view of the following detailed description and the accompanying drawings in which:

Generally, the present invention is directed to providing one or more hermetically sealed electrical feedthrough conductors across the peripheral boundary between a first region of a semiconductor substrate to be hermetically sealed and a second region of said substrate. The feedthrough conductor is formed by first forming a planar oxide layer on the surface of the silicon substrate along the predetermined path of the feedthrough conductor across the periphery where the sealing is to take place. This oxide layer has at least one planar projection extending out on each side of the path and shaped so as to come to a point. A planar metal feedthrough conductor is then formed on the surface of the oxide such that the oxide surface including its projections are substantially covered by the metal feedthrough conductor except for a small border around the perimeter of the feedthrough conductor of sufficient size to prevent the formation of a conductive path between the feedthrough conductor and the underlying silicon substrate. The region to be hermetically sealed on the silicon substrate is then covered by an insulator element having a planar periphery matching the periphery of said first region, such that it is in contiguous contact with the planar periphery, including the metal feedthrough conductor, along the entire periphery of the region to be hermetically sealed. Finally, the two substrates are electrostatically bonded together by first heating the insulator element to a point where it is electrostatically conductive and then applying an electrical potential of predetermined value across the insulator element and the silicon substrate while externally temporarily grounding the feedthrough conductor to the silicon substrate, thereby causing the planar insulator element to be attracted into intimate contact with the feedthrough conductor and the silicon substrate progressively so as to close all gaps and form a hermetic bond therebetween and a compression seal across the exposed border of the oxide layer.

Figure 1:
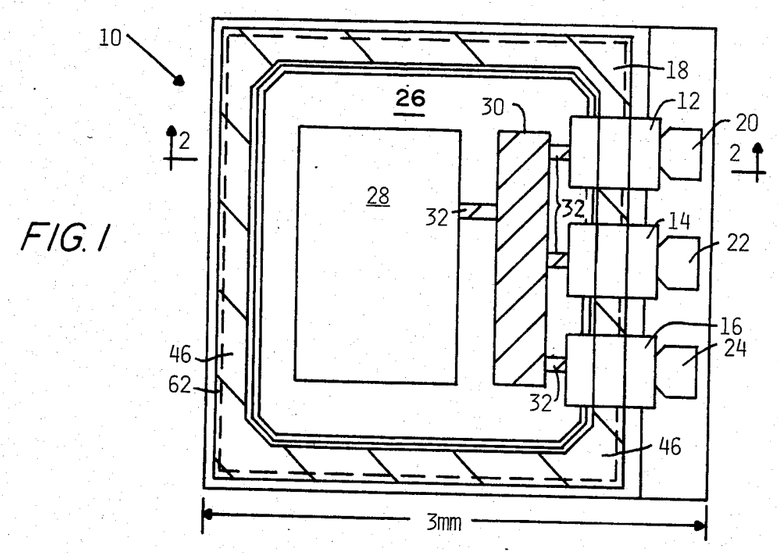
FIG. 1 is a top view of an exemplary hermetically sealed integrated circuit sensor illustrating a plurality of electrical feedthrough conductors formed across the sealed boundary between the sensor and outside contact pads taken along the line 1—1 of FIG. 2.

Referring now to the figures, FIG. 1 is a top view of an exemplary hermetically sealed integrated circuit pressure sensor 10 which includes a plurality of electrical feedthrough conductors, formed in regions 12, 14 and 16, each extending across the sealed boundary area or periphery, shown at 18, between respective outside electrical contact pads or bonding pads 20, 22 and 24 and an interior sealed region 26. In the exemplary sensor 10, interior region 26 includes a capacitive pressure transducer region 28 and a region of on-chip electronics 30. Conventional integrated circuit conductors 32, e.g. thin film metal strips, connect the on-chip integrated circuit electronics 30 with the capacitive transducer region 28 and each of the feedthrough conductor regions 12, 14 and 16.

Figure 2:
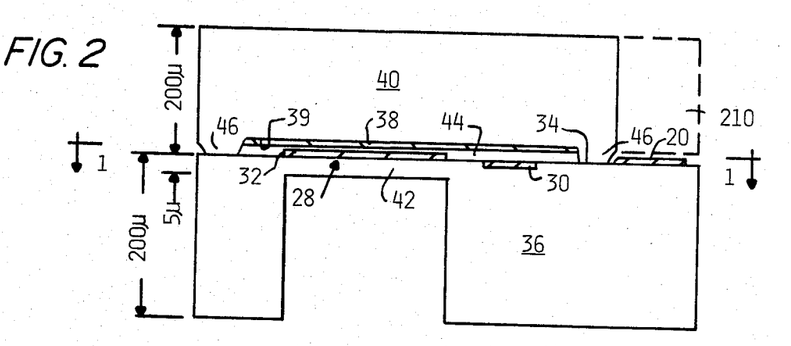
FIG. 2 is a cross-sectional side view of the sensor of FIG. 1 taken along line 2—2.

A side view of the sensor 10 of FIG. 1 is shown in FIG. 2. As illustrated in FIG. 2, a parallel plate capacitive pressure transducer 28 may be created by depositing a first metallization layer 32 on the surface 34 of a semiconductor substrate 36, and depositing a second metallization layer 38 on an opposite surface 39 of an insulator substrate or element 40 that is positioned in parallel with surface 34 and spaced a predetermined distance therefrom, and forming a thin diaphragm 42 in the semiconductor substrate 36 in region 28. As described above, silicon is commonly used as the semiconductor substrate in integrated circuits, and Pyrex glass is preferred for use as insulator 40, since it has thermal expansion characteristics that closely matches that of silicon so as to provide the best anodic bonding therewith. As can be seen, the surfaces of substrate 36 and insulator 40, along with metal layer 32 and metal layer 38, define a hermetically sealed reference space or chamber 44. The gap between metal plates 32 and 38 in chamber 44 may normally be on the order of 2 microns. An exemplary height for glass substrate 40 is shown as 200–500 microns, the thickness of diaphragm 42 may be on the order of 25 microns and the thickness of silicon substrate 36 may be 200–500 microns. As seen in FIG. 1, the overall surface dimensions of sensor 10 may be 3 millimeters.

With hermetic sealing of chamber 44 from the outside environment, any pressure change on the external side of diaphragm 42 causes diaphragm 42 to vary in position. If the external pressure goes up, for example, the diaphragm 42 presses closer to the fixed metal layer 38 on insulator element 40, causing the parallel plate capacitance between plates 34 and 38 to increase. If pressure goes down, the diaphragm 42 moves away from metal layer 38 causing the capacitance to correspondingly decrease.

As best seen in FIG. 2, hermetically sealed reference chamber 44 may be conventionally formed by etching a depression in the surface of glass 40 corresponding to the area or region 26 of reference chamber 44 that is to be hermetically sealed. This etching process creates glass 40 surface 39 and a mesa region 46 which extends down below the surface 39 of glass element 40. Mesa region 46 of glass element 40 defines the perimeter or periphery of the hermetically sealed region 44. To enable hermetic sealing, the mesa 46 needs to have a substantially planar surface, and the surface of the semiconductor substrate 36 on which mesa 46 rests must have a correspondingly planar surface so as to enable anodic or Mallory bonding of the two surfaces to form the hermetically sealed reference chamber 44. In a preferred embodiment of the present invention, the glass element 40 is anodically bonded to the silicon substrate 36 in a vacuum so as to prevent any substantial temperature effects which otherwise would be caused by gas expansion of any remaining gas in the sealed chamber 44 after hermetic sealing had been completed.

Figure 3:
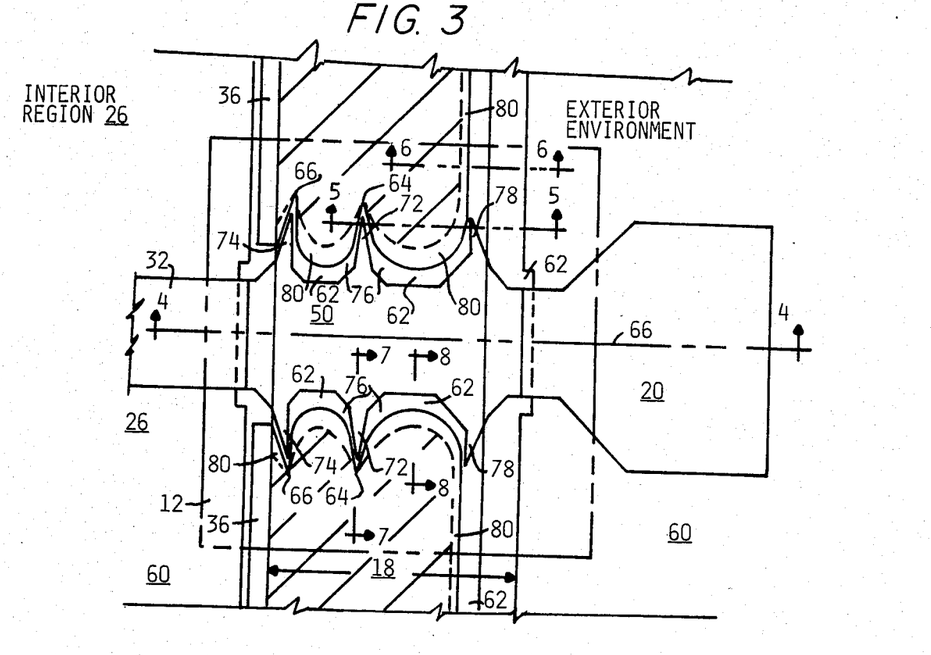
FIG. 3 is a detailed top view of an electrical feedthrough conductor according to the present invention.

As previously described, a significant drawback of prior art devices wherein a hermetically sealed region is desired, is the difficulty in providing feedthrough conductors between the hermetically sealed region and the outside world that will provide a complete seal and will maintain the seal created during anodic bonding. Referring now to FIG. 3, illustrated therein is a detailed top view of an exemplary feedthrough conductor 50 according to the present invention which is in the region 12 shown in FIG. 1. Corresponding feedthrough conductors are formed in regions 14 and 16, and are therefore not described further herein.

According to a preferred embodiment, feedthrough conductor 50 is a planar metal layer formed on the surface of the silicon substrate 36 across the periphery 18 between the external bonding pad 20 and the region 26 to be hermetically sealed. Since the silicon substrate is conductive, an insulative layer must also be formed between the substrate 36 and conductor 50. A conventional layer of silicon dioxide may be grown on the surface of the substrate 34 and then subtractively etched in the desired pattern along the predetermined path of the metal layer comprising conductor 50. The preferred metal to be used for this metal layer is titanium, since it has been found to be somewhat ductile and also is one of the better metals for creating a mallory bond to an adjacent juxtaposed glass surface during the bonding process.

Figure 4:
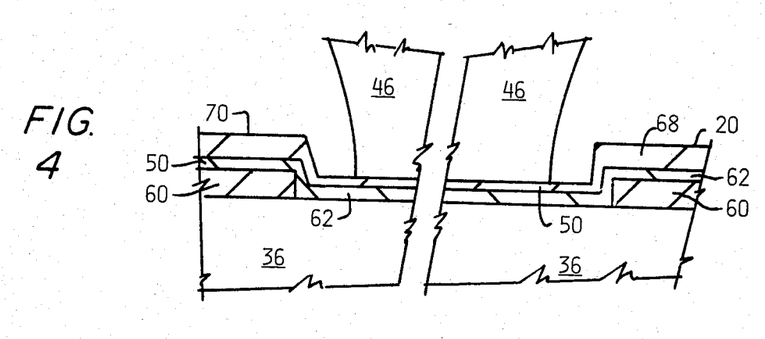
FIG. 4 is a cross-sectional side view of the feedthrough conductor of FIG. 3, taken along line 4—4.

FIG. 4 shows a cross-sectional side view of the feedthrough conductor 50 viewed along the line 4—4 of FIG. 3. Preferably, a thick oxide layer 60 is first formed on opposite sides of the periphery 18 on top of the silicon substrate 34. Then a thinner planar oxide layer 62 is formed across periphery 18 along the predetermined path of the feedthrough conductor 50. As seen in FIG. 3, a plurality of planar projections 64, 66 are formed on each side of the center line 56 of the path of said feedthrough conductor. These planar projections are shaped to come to a point preferably at a position along a perpendicular direction with respect to center line 56 and be sufficiently sharp so as to create deformation of the glass substrate 40 against the oxide point during mallory bonding and thereby perfect a hermetic seal at this point. Note that more than one projection 64, 66 is desirable to increase the reliability of the resultant seal. Only one such projection is required on each side of feedthrough conductor 50. Planar feedthrough conductor 50 is thereafter formed on top of the planar oxide layer 62, preferably by depositing the metal layer on the surface of the oxide in a conventional manner.

Referring again to FIG. 3, metal feedthough conductor 50 is formed on the surface of said oxide to include a plurality of projections 72 and 74 on each side of the centerline 56 of the predetermined path of the feedthrough 50. As can be seen, projection 72 lies on top of oxide projection 64 and metal projection 74 lies on top of oxide projection 66. Projections 72 and 74 are shaped to form matching points to respective projections 64 and 66 of oxide layer 62. Thus, deformation of glass substrate 40 will also be created against projections 72 and 74 so as to perfect hermetic seals at these points. Preferably, the surface of metal feedthough conductor 50 is formed so as to substantially cover the surface of said oxide layer 62 except for a small border 76 existing along the perimeter of the metal feedthrough conductor 50. Border 76 must be of sufficient size to prevent the inadvertent formation of a metal conductive path between feedthrough conductor 50 and silicon substrate 36.

A further projection 78 may also be formed in the metal feedthrough conductor 50 where shown in each side of the centerline 56 of the path of said conductor to provide further protection against the loss of a hermetic seal across periphery 18.

In a preferred embodiment of the invention, the thick oxide 60 is formed to have a depth of about 15,000 angstroms (1.5 microns) and the thin oxide 62 is formed to have a thickness of 1,000 angstroms (0.1 microns). Finally, the titanium layer feedthrough conductor 50 formed on the surface of oxide layer 62 is formed to have a thickness of approximately 1,000 angstroms (0.1 microns). As best seen in FIG. 4, the portion of feedthorugh conductor 50 on opposite sides of periphery 18 is preferably thicker in regions 68 and 70, e.g., on the order of 5,000 angstroms.

The above described structure of the planar metal feedthrough conductor 50, including at least one projection on each side of the conductor along the predetermined path thereof, in combination with the underlying oxide layer and its corresponding one or more projections on each side of the predetermined path of the conductor enable a hermetic seal to be formed across the periphery 18 between the interior region 26 to be hermetically sealed and the exterior environment during mallory bonding of the glass substrate 40 thereto.

When the glass insulator element 40 is placed on the silicon substrate 36 such that the surface of mesa region 46 of glass element 40 is in substantial contiguous contact with the planar surface 34 of the silicon substrate 36 along the periphery 18 of the region to be hermetically sealed, these two substrates 36, 40 can be electrostatically bonded together in a conventional manner, as above described, by first heating the glass (preferably Corning Pyrex glass) to a point where it is electrically conductive, e.g. between 300° C. and 600° C. and then applying a large DC voltage in the range of 400–2,000 volts between the two substrates 36, 40 so as to concentrate the electrostatic forces between the two substrates. It is estimated that substantial bonding forces in excess of 1000 psi result during this bonding process.

The present invention takes advantage of these large electrostatic bonding forces occurring when the surface of glass 40 is attracted into forceable intimate contact with the periphery 18 in a progressive manner to provide a seal wherein all gaps across said periphery are eliminated between the internal chamber 26 and the exterior environment.

According to the present invention, since the surface of glass 40 along mesa 46 mallory bonds with a contiguous surface 34 of silicon substrate 36, the forces created thereby are used to create a compression bond across the surfaces of the feedthrough conductors 50 formed across the periphery 18. The sealing problem in prior art devices has been that the overlying glass surface ramps over the edges of the conductors and any underlying insulator layers creating gaps or tenting regions at these edges which would extend across the bond periphery thereby creating an imperfect seal.

According to the present invention, the projections in the oxide at 64 and 66 and the corresponding projections in the conductor 50 at 72 and 74 act to concentrate the electrostatic forces occurring during electrostatic or mallory bonding so as to deform the glass substrate 40 and seal the region about that point. This process can be seen in FIG. 3, wherein tenting regions 80 which exist between the oxide and the underlying substrate 36, and between conductor 50 and oxide 62 reduce to substantially zero at the corresponding points of the oxide 62 and conductor 50 planar projetions 64, 66 and 72, 74 respectively. The dashed lines shown in FIG. 3 illustrate the expected region of the silicon substrate 36 surface that is hermetically sealed during the electrostatic bonding of the glass insulator element 40 to the silicon substrate 36. The step up to the oxide 62 at the exterior side of the periphery 18 also creates a tenting region 80, but this is contiguous along the entire length of periphery 18, as seen in dotted line phantom in FIG. 1, between conductors 50, such that the sharp edge of oxide layer 62 also creates a compression seal across this border of the periphery 18. Oxide layer 62 is formed on the external environment side of periphery 18 to ensure that no surface of silicon substrate 36 is exposed to the external environment.

Although it is believed that the compression bond formed across the surface of conductor 50 is sufficient to create a reliable hermetic seal, titanium is preferably used for the feedthrough conductor 50, according to the present invention, because it also creates an ectrostatic bond with the surface of glass substrate 40. Note also that compression bonding and electrostatic bonding of conductor 50 to the surface of glass substrate 40 also will occur only if the planar surface of conductor 50 does not have any substantial irregularities or step defects. Note that in a preferred embodiment, the mesa 46 is about 250 microns across and the feedthrough conductor 50 is approximately 150 microns wide at its narrowest across the periphery 18.

Figure 5:
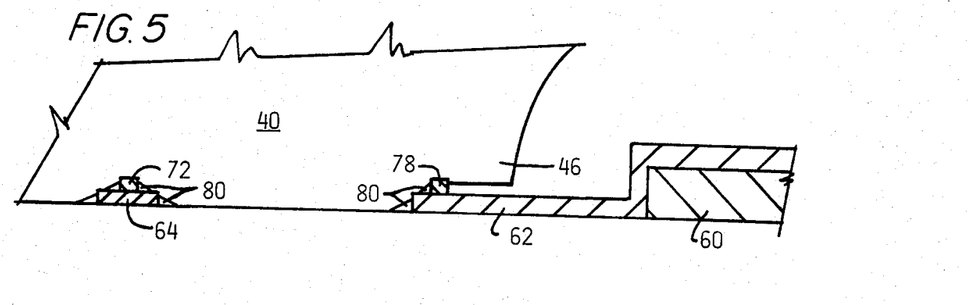
FIG. 5 is a cross-sectional side view of the feedthrough conductor of FIG. 3, taken along line 5—5.

A more detailed view of the various areas in which both electrostatic bonding and compressive seals are formed according to the present invention is shown in FIGS. 5-8. FIG. 5 illustrates a cross sectional side view of the feedthrough conductor of FIG. 3 taken along the line 5—5. As seen in FIG. 5, the mesa 46 of glass element 40 conforms its shape around the points formed on projections 72, 74 of feedthrough conductor 50 and the points formed on projections 64, 66 of oxide layer 62. As can be seen, a tenting region 80 is formed about points 72 and 74 and points 64 and 66, but, as will be seen with respect to FIG. 7, these regions are reduced to substantially zero at the end-point of each projection. FIG. 5 illustrates how the surface of glass substrate 40 is deformed during the bonding process as a result of the high electrostatic forces generated thereby.

Figure 6:
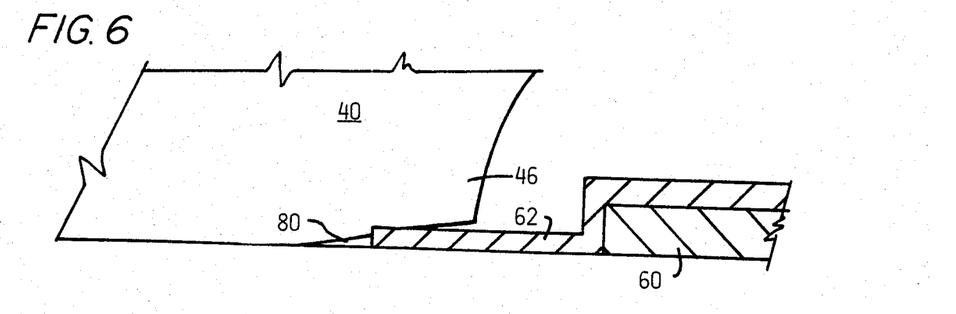
FIG. 6 is a cross-sectional side view of the feedthrough conductor of FIG. 3, taken along line 6—6.

FIG. 6 is a cross-sectional side view of the feedthrough conductor of FIG. 3 taken along line 6—6. As seen in FIG. 3, this side view is solely of the glass element 40 in contact, substantially across the entire periphery 18, with the planar surface 34 of silicon substrate 36. Only at the right-hand exterior edge of periphery 18 does the glass substrate abut against the edge of oxide layer 62, thereby creating a tenting region 80. However, the edge of oxide step 62 creates a sharp edge compression seal which prevents any air passage along this step across the length of the periphery 18.

Figure 7:
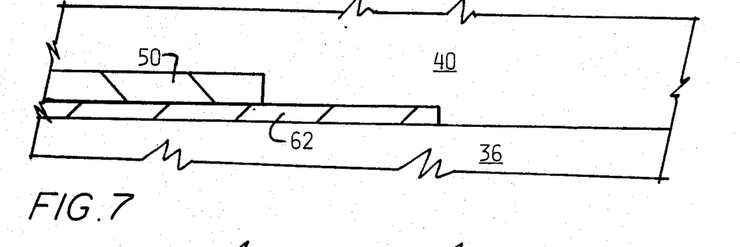
FIG. 7 is a cross-sectional side view of the feedthrough conductor of FIG. 3, taken along line 7—7.

FIG. 7 is a cross-sectional side view of the feedthrough conductor 50 of FIG. 3 taken along the line 7—7. FIG. 7 illustrates the compressive seal forces at the farthest end point of the projections of both oxide 62 and feedthrough conductor 50. The pointed shapes at these end points magnify the effective clamping forces in the vicinity thereof during electrostatic bonding, thereby increasing the deformation of the glass substrate 40 around these points and eliminate any leak path there, thereby perfecting the hermetic seal desired. Note that the edge of the metal feedthrough conductor may also compress during this process since it is a deformable metal to thereby facilitate the elimination of any potential leak path at the metal oxide step. It should be realized, however, that the glass is the softest and most deformable of the various materials, mentioned above, during the mallory bonding process.

Figure 8:
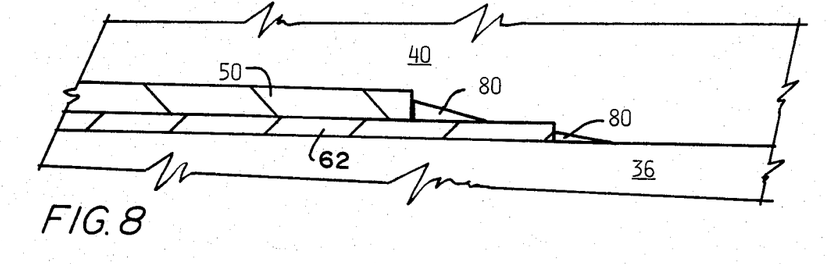
FIG. 8 is a cross-sectional side view of the feedthrough conductor of FIG. 3, taken along line 8—8.

FIG. 8 is a cross-sectional side view of the feedthrough conductor 50 of FIG. 3 taken along line 8—8 and illustrating the tenting regions 80 along those portions of the edge of feedthrough conductor 50 and oxide layer 62 other than at the end point of projections 72, 74 and 64, 66 respectively.

Figure 9:
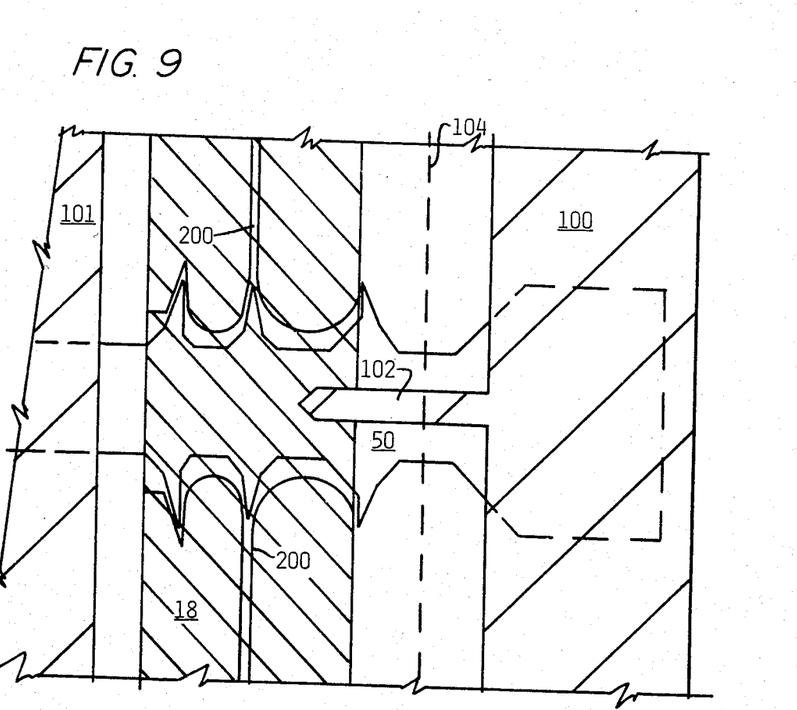
FIG. 9 is a detailed top view of the electrical feedthrough conductor according to the present invention illustrating further aspects of the present invention.

FIG. 9 illustrates a top view of an electrical feedthrough conductor 50 according to the present invention illustrating a preferred method of grounding the feedthrough conductor during electrostatic bonding so as to enable electrostatic bonding of the top surface of feedthrough conductor 50 to the surface of glass substrate 40 during this process. The diagonal cross-hatched lines at 100 represent a thin-film metal layer or plate deposited on the underside surface of glass 40. This metal layer 100 is coupled to the feedthrough conductor 50 by means of a tab 102 which extends across a line 104 of the glass substrate 40. Tab 102 is designed to extend down and be in intimate contact with feedthrough conductor 50 when the mesa 46 of the glass substrate 40 is placed in contact with the feedthrough conductor 50 and the surrounding periphery 18 of silicon substrate 36. Line 104 is a dicing line and illustrates that a portion of the glass substrate 40 is cut away after electrostatic bonding so that feedthrough conductor 50 will no longer be coupled to the glass substrate metal plate 100. A different view of this portion of glass substrate 40 is shown in phantom in FIG. 2 at 210.

The diagonal cross-hatched lines at 101 in FIG. 9 represent a thin film metal layer or plate deposited on the underside surface of glass substrate 40 in the area corresponding to the interior sealed region 26 of sensor 10. Metal plate 101 functions to protect the on-chip electronics 30 from the high voltages that would otherwise be coupled across this integrated circuit during the electrostatic bonding process. The on-chip electronics 30 would very likely be damaged or destroyed if such a metal protection plate were not there to prevent the application of the high voltages across the circuits formed in the silicon semiconductor 36. Metal plate 101 may be part of metal layer 38, described previously, or may be formed separate therefrom in a conventional manner. Note also that the height of the chamber 44 in the area of electronics 30 may be different from the height of the chamber 44 in region 28 merely by separately etching these regions of the surface of glass 40. In a conventional manner, the interior metal protection plate 101 is coupled to the interior surface 34 of silicon substrate 36, e.g. at the four corners of the interior region 26, so as to provide reliable contact with the silicon substrate 36 during the bonding process. Note that contact between metal layers 101 and 100 may be made via the use of one of the conductors 50 as a ground conductor.

FIG. 9 also illustrates an alternate embodiment of the present invention wherein an oxide strip 200 is formed along the center of periphery 18, extending between adjacent points 64 of the oxide layer 62, such that a continuous oxide strip is formed between each feedthrough conductor around the entire periphery 18 of the sensor 10. Such a structure enables a compression bond to be formed on each edge of this oxide strip 200 along its entire length, to thereby create an additional seal therealong.

It should be kept in mind that the present invention relates in general to the formation of a hermetically sealed feedthrough conductor between an external environment and an internal hermetically sealed chamber. The above-described use of such a structure in a capacitive transducer, wherein a diaphragm is formed in the silicon substrate, is merely an exemplary use to show one application of the present invention. It would be obvious to one of ordinary skill in the art to apply the teachings of the present invention relating to the formation of hermetically sealed feedthrough conductors to other applications, and the present invention is envisioned as encompassing such additional applications.

Various modifications of the invention will become apparent to those skilled in the art from the foregoing description and accompanying drawings. Such modifications are intended to fall within the scope of the appended claims.

What is claimed is:

1. A method for forming a hermetically sealed metal feedthrough conductor across the planar surface of a semiconductor substrate, comprising the steps of:
   (a) forming a planar insulator layer on said surface along a predetermined path, said insulator layer having at least one planar projection extending out on each side of said path and shaped so as to come to a point;
   (b) forming a planar metal feedthrough conductor on the surface of said insulator layer such that the surface of said insulator layer including said projections is at least partially covered by said metal feedthrough conductor, said feedthrough conductor being of a configuration to prevent the formation of a conductive path between said feedthrough conductor and said semiconductor substrate and being proximate said point on said planar projections of said insulator layer to form substantially matching points therewith,
   (c) placing the planar surface of an insulator element in contact with said planar semiconductor surface and said metal feedthrough conductor; and
   (d) Mallory bonding said insulator element to said semiconductor surface, said points on said planar projections of said insulator layer and said feedthrough conductor causing the formation of a compression bond between said insulator element and said feedthrough conductor and the exposed portions of said insulator layer.

2. The method of claim 1 wherein the step of forming a planar insulator layer comprises the step of forming a layer of silicon dioxide on the surface of said semiconductor substrate having a depth of approximately 0.1 microns, and wherein the step of forming a planar metal feedthrough conductor comprises the step of forming a layer of titanium by deposition of titanium on the surface of said insulator layer and having a depth of approximately 0.1 microns.

3. A method for forming a hermetically sealed feedthrough conductor across a correspondingly sealed boundary area on the surface of a silicon substrate, wherein the seal is formed by electrostatically bonding the surface of a glass substrate to said silicon substrate surface, comprising:
   forming an oxide layer on said silicon surface along a predetermined path extending across the boundary area and having at least one planar projection extending out to a point on each side of said oxide layer that is sufficiently sharp so as to create deformation of the glass surface in contact therewith in the area of said projections during bonding;
   forming a metal feedthrough conductor layer on the surface of said oxide layer, the edge thereof spaced from the edge of the oxide layer a distance sufficient to prevent a conductive path to be formed between said feedthrough conductor and said silicon surface, said points being proximate said planar projections of said oxide layer so as to form substantially matching points therewith;
   placing said glass surface in contact with said silicon surface; and
   electrostatically bonding said glass surface to said silicon surface, including forming a compression seal across the exposed surface of said metal conductor during said bonding, a compression seal about said planar projections thereof, and a compression seal about the planar projections of said oxide layer, thereby forming a hermetically sealed boundary area.

4. The method of claim 3 wherein said electrostatic bonding further creates an electrostatic bond between said feedthrough conductor layer and said glass surface.

5. A method for forming a hermetically sealed metal feedthrough conductor in the periphery between first and second regions on a planar silicon substrate, said second region surrounding said first region, comprising the steps of:
   (a) forming a planar oxide layer on the surface of said silicon substrate along a predetermined path between said two regions across said periphery, said oxide layer having at least one planar projection extending out on each side of said path and shaped so as to come to a point;
   (b) forming a planar metal feedthrough conductor layer on the surface of said oxide layer such that the surface of said oxide layer, including said projections, is substantially covered by said metal feedthrough conductor, said feedthrough conductor being spaced from the edge of said oxide layer to prevent the formation of a conductive path between said feedthrough conductor and said silicon substrate, (c) placing an insulator element, sized to encapsulate said first region and having a planar surface matching said periphery between said first and second regions, in corresponding contact with said periphery, including contact with said metal feedthrough conductor; and (d) electrostatically bonding said insulator element to said silicon substrate periphery, by: (i) heating said insulator element to a point where it is electrically conductive; and (ii) applying an electrical potential across said insulator element and said silicon substrate while temporarily externally connecting said feedthrough conductor to said silicon substrate, such that said planar insulator element is caused to be attracted into intimate contact with said feedthrough conductor and said periphery progressively so as to close all gaps and form a bond therebetween and a compression seal along the exposed edge of said oxide layer.

6. The method of claim 5 wherein the step of forming a planar oxide layer having at least one planar projection extending out on each side of said path comprises the step of forming each said planar projection along a direction perpendicular to the axis of the path of said oxide layer.

7. The method of claim 6 wherein the step of placing an insulator element in contact with said periphery comprises the step of placing a glass substrate having a polished planar surface in matching contact with said planar periphery.

8. In an integrated circuit device formed on the planar surface of a silicon substrate, a method for forming a hermetically sealed metal feedthrough conductor across the periphery between a first region of said integrated circuit device to be hermetically sealed and a second region of said integrated circuit device, comprising the steps of:

(a) forming a planar oxide layer on the surface of said integrated circuit device along the predetermined path of said metal feedthrough conductor across said periphery, said oxide layer having at least one planar projection extending out on each side of said path and shaped so as to come to a point at its furthest distance from said path;

(b) forming said planar metal feedthrough conductor on the surface of said oxide such that the surface of said oxide including said projections are substantially covered by said metal feedthrough conductor except for a small border along the perimeter of said metal feedthrough conductor of sufficient size to prevent the formation of a conductive path between said feedthrough conductor and said silicon substrate, (c) placing an insulator element, sized to encapsulate said first region and having a planar surface matching said periphery, in corresponding contact with said periphery, including said metal feedthrough conductor; and (d) electrostatically bonding said insulator element to said periphery of said integrated circuit device, by:
(i) heating said insulator element to a point where it is electrically conductive; and (ii) applying an electrical potential of predetermined value across said insulator element and said silicon substrate while temporarily externally connecting said feedthrough conductor to said silicon substrate, thereby causing said planar insulator element to be attracted into intimate contact with said feedthrough conductor and said integrated circuit periphery progressively so as to close all gaps and form a bond therebetween and a compression seal across the exposed border of said oxide layer.

9. The method of claim 8 wherein the step of forming a planar oxide layer having at least one planar projection extending out on each side of the predetermined path of said metal feedthrough conductor includes the step of forming each said planar projection in a direction substantially perpendicular to the path of said feedthrough conductor.

10. The method of claim 8 wherein the step of placing an insulator element in contact with said periphery comprises the step of placing a glass substrate having a polished surface in matching contact with the surface of said periphery.

11. An apparatus for providing a hermetically sealed feedthrough conductor across the planar periphery between a first hermetically sealed region of a semiconductor substrate and a second region of said semiconductor substrate, wherein said first region is hermetically sealed by means of an insulator element electrostatically bonded to said planar periphery, comprising:

a planar insulator layer overlying said semiconductor substrate along the predetermined path of said feedthrough conductor across said periphery and having at least one planar projection extending out on each side of said path and shaped so as to come to a point;

a metal feedthrough conductor layer overlying said planar insulator layer having planar projections corresponding in position to said insulator layer projections such that said insulator layer is substantially covered by said feedthrough conductor layer except for a small border along the perimeter of said metal feedthrough conductor layer; and said electrostatic bond formed at said planar periphery between said first and second regions creating a hermetic seal in the region of said feedthrough conductor layer by compression bonding of said insulator element to said projections of said insulator layer and said feedthrough conductor layer.

12. The apparatus of claim 11 wherein said feedthrough conductor layer comprises a layer of titanium deposited on the surface of said insulator layer and having a depth of approximately 0.1 microns.

13. The apparatus of claim 11 wherein said insulator layer comprises a layer of silicon dioxide subtractively etched on the surface of said semiconductor substrate and having a depth of approximately 0.1 microns.

14. The apparatus of claim 11 wherein said insulator element comprises a glass substrate.

15. The apparatus of claim 11 wherein each said planar projection of said planar insulator layer is formed along a path perpendicular to said predetermined path of said feedthrough conductor.

16. The apparatus of claim 11 wherein said planar insulator layer further overlies the outer edge of said planar periphery nearest said second region, said electrostatic bond formed at said planar periphery further creating a compression bond across the step formed by the planar insulator layer along said outer edge of said periphery; and said metal feedthrough conductor layer further defining a planar projection extending out on each side of the path of said feedthrough conductor layer shaped so as to come to a point substantially adjacent said edge of said insulator layer extending along the outer edge of said periphery.

17. The apparatus of claim 11 wherein said planar projections are positioned substantially in the middle of said periphery and wherein said planar insulator layer further includes a thin oxide line overlying said silicon and positioned in the middle of said periphery and extending from one of said planar projections formed in said planar insulator layer along said periphery until said oxide line contacts a next adjacent planar projection.

18. The apparatus of claim 11 further comprising means for coupling said feedthrough conductor to said semiconductor substrate during bonding; and means for eliminating said coupling once electrostatic bonding has been completed.

19. The apparatus of claim 18 wherein said means for coupling said feedthrough conductor to said semiconductor substrate comprises forming a conductive layer on the surface of said insulator element juxtaposed to said semiconductor substrate exterior to the region thereof electrostatically bonded to the silicon substrate and having a tab thereon formed to extend partly across the periphery so as to contact the feedthrough conductor when the insulator element is contiguous with the semiconductor substrate and means for coupling said metal layer to the silicon substrate, said means for eliminating said coupling comprising forming the metal layer in a part of the insulator element that is outside of the dicing line of the glass element such that when such dicing of the glass element occurs, the coupling between said tab and said silicon substrate is eliminated.

20. An apparatus for providing a hermetically sealed feedthrough conductor across the planar periphery between a first hermetically sealed region of a silicon substrate and a second region of said silicon substrate, wherein said first region is hermetically sealed by means of a glass substrate having a mesa surface on one surface thereof that is electrostatically bonded to said planar periphery, comprising:

a planar silicon dioxide layer overlying said silicon substrate along the predetermined path of said feedthrough conductor across said periphery and having at least one planar projection extending out on each side of said path so as to come to a sharp point and wherein said planar projections are positioned substantially in the middle of said periphery and wherein said planar insulator layer further includes a thin oxide line overlying said silicon substrate and positioned in the middle of said periphery and extending from one of said planar projections formed in said planar silicon dioxide layer along said periphery until said oxide line contacts a next adjacent planar projection; and a metal feedthrough conductor layer overlying said silicon dioxide layer and having planar projections corresponding in position to said silicon dioxide layer projections such that said silicon dioxide layer is substantially covered by said feedthrough conductor layer except for a small border along the perimeter of said metal feedthrough conductor layer;

said electrostatic bond formed at said planar periphery between said first and second regions creating a hermetic seal in the region of said feedthrough conductor layer by compression bonding of said glass substrate to said projections of said silicon dioxide layer and said feedthrough conductor layer.

21. The apparatus of claim 20 wherein said hermetically sealed region of said silicon substrate includes an integrated circuit formed therein, said apparatus further comprising means for protecting said integrated circuit from damage during the electrostatic bonding of said glass substrate to said silicon substrate.

* * * * *